UNITED STATES PATENT OFFICE.

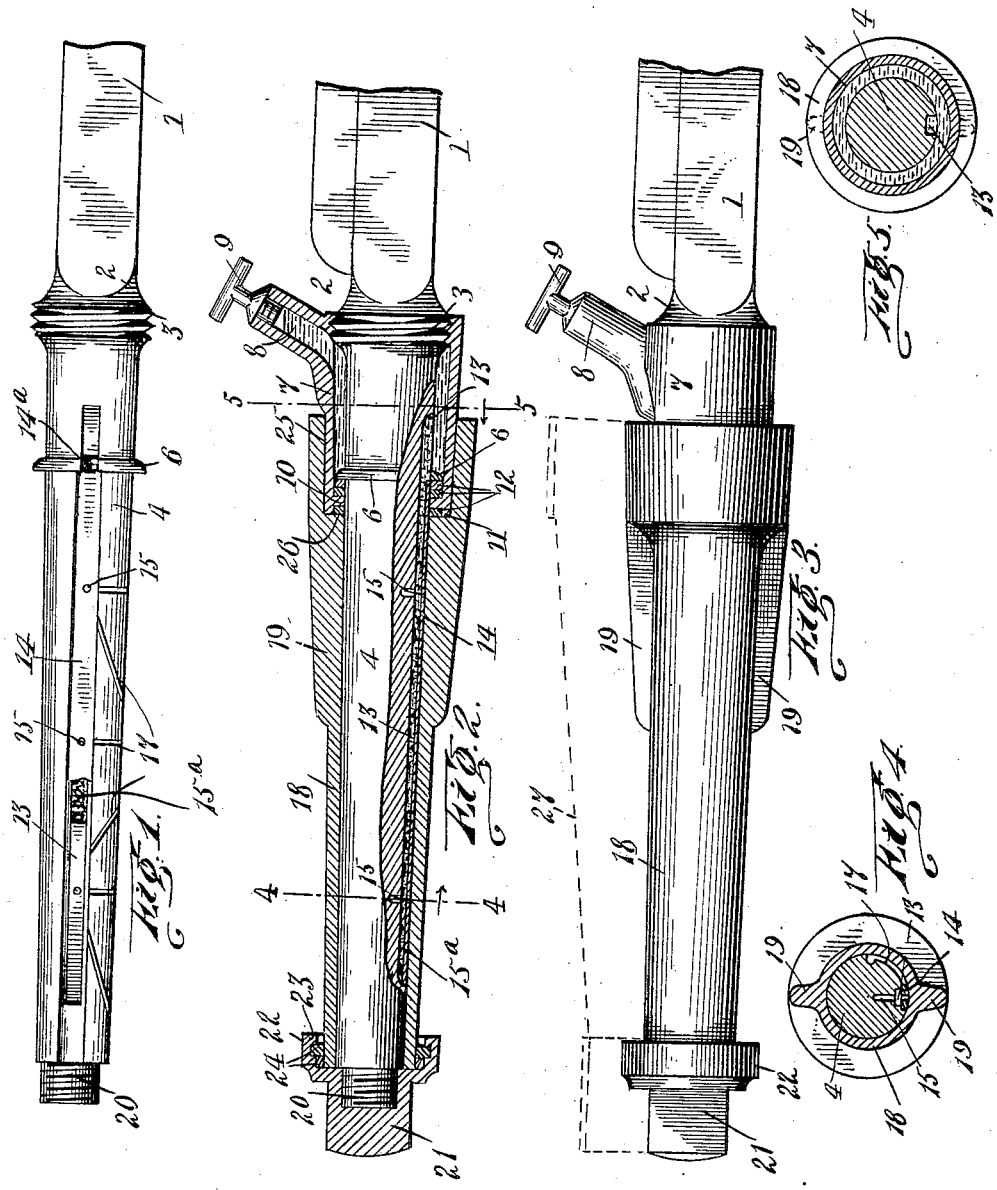

LEON DAMOUR, OF TROIS PISTOLES, QUEBEC, CANADA.

AXLE-OILING DEVICE.

No. 909,370.     Specification of Letters Patent.     Patented Jan. 12, 1909.

Application filed March 14, 1908. Serial No. 421,047.

*To all whom it may concern:*

Be it known that I, LEON DAMOUR, a subject of the King of Great Britain, residing at Trois Pistoles, county of Temiscouata, in the Province of Quebec, Canada, have invented certain new and useful Improvements in Axle-Oiling Devices; and I do hereby declare that the following is a full, clear, and exact description of the invention, such as will enable others skilled in the art to which it appertains to make and use the same.

My invention relates to vehicle axles.

The object of my invention is to provide a self-oiling axle of extremely simple construction, which is dust proof, and in which a fresh supply of oil is fed to the spindle instead of using the same oil over again, or having to remove the wheel for the purpose of oiling.

A further object is to provide a fixed oil reservoir on the axle, which is adapted to retain a packing ring against an annular shoulder on the spindle of the axle, and to serve as a partial bearing for a rotatable sleeve, and to provide means for feeding the oil from the reservoir to the oil retaining grooves on the spindle.

A further object is to provide a construction adapted for use with ordinary forms of vehicle wheels and retaining nuts.

My invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a plan view of the spindle and a portion of the axle, the sleeve and nut being removed; Fig. 2 is a longitudinal vertical section through the sleeve, nut and reservoir, and showing the spindle partly broken away; Fig. 3 is a side elevation of the end of an axle, showing the application of my invention in side elevation; Fig. 4 is a transverse section on line 4—4 of Fig. 2; and, Fig. 5 is a transverse section on line 5—5 of Fig. 2.

Referring to the drawings, 1 designates an axle of common construction, having an enlarged shoulder 2, provided with exterior screw-threads 3, and having a spindle 4, preferably of tapered construction. The spindle 4 is provided adjacent the screw-threads 3 with an annular flange 6, which serves as a retaining means coöperating with a flange on the oil reservoir hereinafter described.

An interiorly screw-threaded oil reservoir 7 is disposed on the spindle so that its screw-threads may engage the screw-threads 3, and the reservoir be fixed against rotation, so that it may serve as a partial bearing for a sleeve hereinafter described.

The reservoir 7 is provided with a filling duct 8, having a screw-threaded closure 9. Adjacent the flange 6 on the spindle 4, the reservoir is provided with a flange 10, leaving a projecting lip 11. Packing rings 12 are disposed between the flange 10 and the flange 6, and are retained in position thereby to prevent the escape of oil from the reservoir 7. A packing ring 12 is also disposed within the projecting lip 11 to prevent the ingress of dust or any matter from the bearing portion of the spindle 4.

The spindle 4 is provided with a longitudinal groove 13, communicating with the reservoir 7 and covered by a removable slidable strip 14, which is provided with a lug 14ᵃ coinciding in shape and position with the flange 6 on the spindle when the strip is in its operative position. The strip 14 is provided with openings 15 to permit the passage of oil to the outer surface of the spindle 4, and disposed in the groove 13 and maintained in position by the strip 14, is a body of felt or other capillary material 15ᵃ, adapted to feed the oil from the reservoir 7 to the groove 13, in quantities such as are needed for the proper lubrication of the spindle 4. Suitable intersecting grooves 17 are formed on the outer surface of the spindle 4, and serve a two-fold purpose in retaining foreign matter therein, so that the spindle 4 is left smooth, and also for retaining a certain quantity of oil therein.

Disposed on the spindle 4 is a rotatable sleeve 18, provided with the usual splines 19, adapted to engage the interior wall of the hub in the usual manner. The spindle 4 is provided with a screw-threaded reduced end 20, on which is disposed a nut 21, having an annular ring 22 provided with a flange 23, adapted to maintain two packing rings 24 in position. The inner end of the sleeve 19 is provided with an enlarged bore 25, which is disposed over the outer end of the oil reservoir 7, leaving a shoulder 26 adapted to maintain the outer packing ring 12 against the flange 10, and also adapted to serve as a bearing against the outer end of the reservoir 7 to prevent lateral displacement of the sleeve 18. The relative position of a hub on the sleeve 18 is shown by the dotted lines 27.

In the operation of the axle, the reservoir 7 may be filled without removing the wheel from the spindle, or without removing the retaining nut 21. The oil is fed in quantities as needed by means of the capillary material 15$^a$, and the dirt and other accumulations are retained in the groove 17. Rotation of the sleeve 18 on the spindle 4 causes the latter to become heated to a certain extent, so that the oil is freely fed to the outer surface of the spindle 4, and the spindle kept properly lubricated. The construction described permits the use of any ordinary form of hub without change, and can be attached to ordinary forms of spindles.

Having thus fully described my invention, what I claim as new, and desire to secure by Letters Patent, is:—

1. In combination with an axle having a spindle provided with a flange, an oil reservoir fixed on the inner end of the spindle and provided with a flange leaving a projecting lip, packing disposed on each side of the flange of the reservoir, means for feeding oil to the surface of the spindle from the reservoir, and a rotatable sleeve disposed on the spindle.

2. In combination with a vehicle axle provided with a longitudinal groove in its spindle, a strip provided with openings and disposed over the groove, an oil reservoir fixed on the axle in communication with the groove, a body of capillary material disposed in the groove and extending to the reservoir, and a rotatable sleeve on the spindle, said spindle being provided with intersecting grooves on its outer surface.

3. In combination with an axle provided with a spindle having a longitudinal groove and having a screw-threaded reduced end, removable perforate means for covering the groove, a capillary body disposed in the groove, an oil reservoir fixed on one end of the spindle in communication with the groove, and a sleeve rotatably disposed on the spindle.

In witness whereof I have hereunto set my hand in the presence of two witnesses.

LEON DAMOUR.

Witnesses:
  Jos. E. Anjou,
  S. J. Lafrance.